G. F. VAN BRUNT.
PACKING.
APPLICATION FILED MAY 22, 1913.

1,137,367.

Patented Apr. 27, 1915.

G. F. Van Brunt,
INVENTOR

WITNESSES

BY

ATTORNEY

UNITED STATES PATENT OFFICE.

GEORGE FRANKLIN VAN BRUNT, OF KEWANEE, ILLINOIS.

PACKING.

1,137,367.  Specification of Letters Patent.   Patented Apr. 27, 1915.

Application filed May 22, 1913. Serial No. 769,258.

*To all whom it may concern:*

Be it known that I, GEORGE F. VAN BRUNT, a citizen of the United States, residing at Kewanee, in the county of Henry and State of Illinois, have invented a new and useful Packing, of which the following is a specification.

This invention has reference to improvements in packing, and is designed to provide a means whereby a movable member may be packed with a cheap grade of packing material and one which would ordinarily wear rapidly, without the movements of the valve producing such rapid wear.

The invention comprises a metallic packing member which may be applied about a valve stem or piston rod, or other movable member to be surrounded by some cheap grade of packing, such as wicking or the like, which will effectively resist leakage without being subjected to wear of moving parts and, therefore, will retain its effectiveness for long periods of time.

In accordance with the present invention the metallic portion of the packing is in the form of a sheet of metal shaped to be wound in encircling relation and to a greater or less extent in helical relation to the moving member, to be held by the walls of the packing chamber and retaining gland, while within the packing chamber the packing material designed to prevent leakage is lodged but separated from the movable member by the metallic lining or shield.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings but may be changed and modified so long as such changes and modifications mark no material departure from the salient features of the invention.

Figures 1, 2:
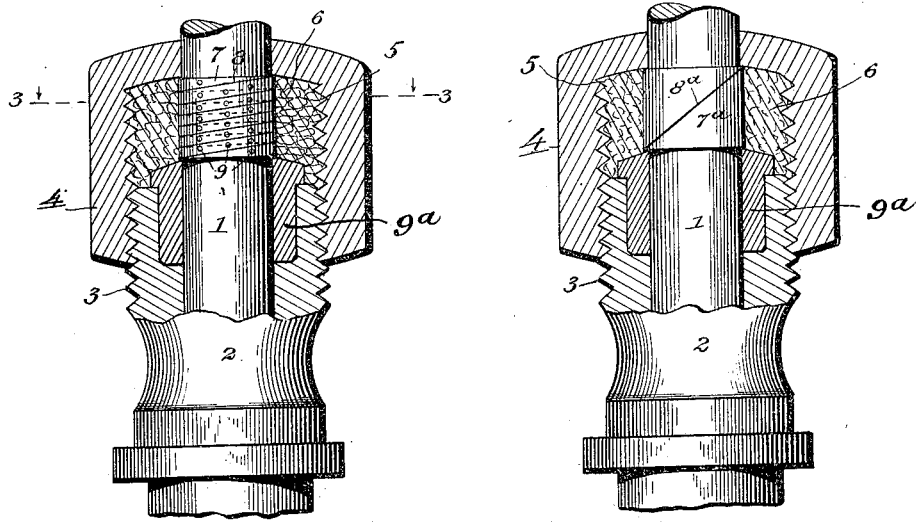
Figure 3:
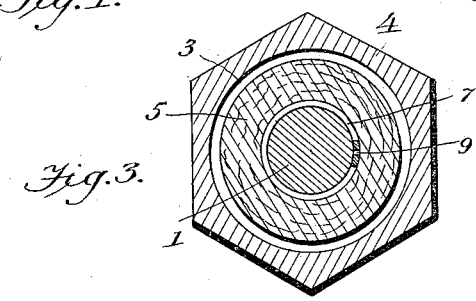
Figure 4:
Figure 5:
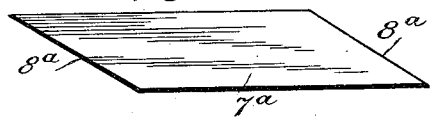

In the drawings:—Figure 1 is a longitudinal diametric section of a packing gland with a movable member traversing the same and provided with the present invention, some parts being shown in elevation. Fig. 2 is a view similar to Fig. 1 but showing a somewhat different form of the invention. Fig. 3 is a section on the line 3—3 of Fig. 1. Fig. 4 is a plan view of one form of the metallic member of the packing spread out or displayed. Fig. 5 is a similar view of another form of the invention.

Referring to the drawings, there is shown a rod 1 traversing a supporting member 2, and to the supporting member, which may have a threaded extension or nipple 3, there is applied a gasket 4 in the form of a cap nut in the particular construction shown, and this cap nut incloses a packing chamber 5 in which may be lodged packing 6. In some structures the body member 2 will represent a portion of a valve casing, while in other structures it may represent a portion of a cylinder head in accordance with whether the rod 1 is a valve stem or a piston rod. Therefore, the members 1 and 2 may represent any structure to which the invention is applicable, and the cap nut 4 may represent any packing member such as a gland or cap nut which may vary in accordance with the particular structure to which the present invention is applied.

The present invention has to do with a metallic protector through which the movable member 1 passes and surrounding which the packing 6 is arranged.

In Figs. 1, 3 and 4 the protecting member is in the form of an elongated strip 7 of sheet metal having the opposite ends 8 reversely beveled. In Figs. 2 and 5 there is a shorter and wider strip 7ª having ends 8ª reversely beveled. In the structure best shown in Fig. 4 the strip 7 may be provided with a series of perforations 9 and while such an arrangement is advantageous, it is not obligatory.

With the strip 7ª applied about the rod 1, as in Fig. 2, the beveled ends 8ª are brought together, so that the strip is in surrounding or encircling relation to the rod and is lodged within the chamber 5 inclosed by the cap nut 4. The packing 6 within the chamber 5 is forced by the cap nut into close engagement with the strip 7ª, thus causing the latter to snugly hug the rod 1, while the elasticity of the packing will maintain the tight fit of the strip 7ª about the rod 1 even though there should be considerable wear of the strip 7ᵃ.

In the structure shown in Figs. 1, 3 and 4 the strip 7, which is relatively greatly elongated, is wound helically about that part of the rod 1 which traverses the packing chamber 5, one end of the strip engaging the inner end wall of a cap nut 4, and the other end engaging against a ring 9ᵃ lodged in a counterbore in the body 2 about the usual passage provided for the rod 1, this ring or bushing 9ᵃ being a common expedient, especially in valve heads.

The packing 6 may consist of the cheap forms of packing, such as wicking or waste or any material which would be liable to relatively quick wear if engaged directly by the rod 1 and may replace some of the high price packings which are found necessary under prevailing practice to withstand wear and other deleterious conditions. The rod 1, however, is in direct contact with a metallic surface presented by the strip 7 or 7ᵃ as the case may be, and by making this metal strip of sheet metal of suitable kind, as, for instance, brass or bronze where the rod 1 is of steel, there is provided a smooth fitting surface surrounding the rod 1 offering but little resistance to the movement of the rod, and at the same time by the expansion of the packing 6 the sheet metal strip 7 is held in close contact with the rod throughout that portion of the rod which is at the time in traversing relation to the packing chamber. In the form shown in Figs. 1, 3 and 4 the strip is wound about the rod in the form of a close helix of several turns and the snug fit of this metallic protecting lining renders this part of the packing practically fluid tight, while the exterior packing prevents any passage of fluid under pressure outside of the metallic lining. However, the packing 6 having practically no wear upon it, will maintain the fluid tight condition for an indefinitely long time, and the entire packing structure is in practice far superior to expensive metallic packing or expensive packings of other characters which ultimately become too worn to then longer maintain the fluid tight condition desired and must be renewed at considerable expense. The metallic portion of the present packing is in fact, when in position, in the form of a plain cylinder without projections and the perforations which may be provided through the metal strip will aid in the distribution of lubricant between the contacting metal surfaces of the lining and the rod 1.

What is claimed is:—

1. The combination with a rod, of packing means therefor comprising a packing chamber surrounding the rod and provided with an entering packing gland, a metallic member in the form of an elongated strip of sheet metal of even width throughout the greater portion of its length with the extremities beveled in opposite directions one to the other, said strip surrounding the rod within the packing chamber, and packing material within the chamber exterior to the strip and compressible by the gland into fluid tight relation to the metal strip and compressing the latter tightly against the rod within the gland, the strip being impervious to the packing material.

2. The combination with a rod, of a packing means therefor comprising a packing chamber surrounding the rod, a continuous elongated and relatively narrow strip of sheet metal of even width throughout the greater portion of its length and wound helically into a plurality of turns about the rod within the packing chamber, and packing material also within the chamber exterior to the strip of sheet metal and compressed within the chamber against the outer surface of the sheet metal to force the latter into packing relation with the rod, the packing being compressed into fluid tight relation to the sheet metal, and said sheet metal strip being impervious to the compressed packing material in the chamber.

3. The combination with a rod, of a packing therefor comprising an elongted narrow strip of sheet metal of equal width throughout the greater portion of its length and with the extremities oppositely beveled one with relation to the other, said strip being wound about the rod a plurality of times in the form of a close helix snugly fitting the rod, and said strip being provided with minute perforations, and a surrounding mass of packing material compressed into fluid tight relation to the strip and rod and holding the strip in the wound condition in contact with the rod, the minute perforations being permeable to lubricating material and impermeable to the compressed packing material.

4. The combination with a rod, of a packing therefor comprising a packing chamber and packing gland entering the chamber, a mass of packing material within the chamber, a metallic lining for the packing material interposed between the rod and said material and comprising an elongated narrow strip of substantially even width throughout the greater portion of its length and wound about the rod a plurality of times into the form of a close helix, said strip being provided with an elongated series of minute perforations pervious to lubricating material and impervious to the surrounding packing material.

5. A packing for rods comprising an elongated narrow flat metallic strip of a length to encircle the rod a plurality of times in the form of a close helix, packing material exterior to the metallic strip and wholly separated by the latter from the rod, and means for compressing the packing material into fluid tight condition and forcing the metal strip against the rod.

In testimony, that I claim the foregoing as my own, I have hereto affixed my signature in the presence of two witnesses.

GEORGE FRANKLIN VAN BRUNT.

Witnesses:
ALBERT GRIGGS,
MYRON L. TURNER.